United States Patent
Salour

(10) Patent No.: US 10,868,840 B1
(45) Date of Patent: *Dec. 15, 2020

(54) MULTIPLE-MASTER DNS SYSTEM

(71) Applicant: 8x8, Inc., San Jose, CA (US)

(72) Inventor: Mehdi Salour, San Jose, CA (US)

(73) Assignee: 8x8, Inc., Campbell, CA (US)

(*) Notice: Subject to any disclaimer, the term of this patent is extended or adjusted under 35 U.S.C. 154(b) by 92 days.

This patent is subject to a terminal disclaimer.

(21) Appl. No.: 16/195,413

(22) Filed: Nov. 19, 2018

Related U.S. Application Data

(63) Continuation of application No. 15/237,320, filed on Aug. 15, 2016, now Pat. No. 10,135,882, which is a continuation of application No. 15/070,974, filed on Mar. 15, 2016, now Pat. No. 9,426,116, which is a continuation of application No. 13/667,627, filed on Nov. 2, 2012, now Pat. No. 9,294,433.

(51) Int. Cl.

| | |
|---|---|
| *G06F 15/173* | (2006.01) |
| *H04L 29/06* | (2006.01) |
| *H04L 12/24* | (2006.01) |
| *H04L 12/26* | (2006.01) |
| *H04L 29/12* | (2006.01) |

(52) U.S. Cl.
CPC ........ *H04L 65/1069* (2013.01); *H04L 41/042* (2013.01); *H04L 41/12* (2013.01); *H04L 43/0811* (2013.01); *H04L 61/1511* (2013.01); *H04L 65/1083* (2013.01); *H04L 61/15* (2013.01)

(58) Field of Classification Search
CPC . H04L 65/1069; H04L 65/1083; H04L 41/12; H04L 41/042; H04L 43/0811; H04L 61/15; H04L 61/1511

USPC .......................................................... 709/224
See application file for complete search history.

(56) References Cited

U.S. PATENT DOCUMENTS

| | | |
|---|---|---|
| 6,381,627 B1 * | 4/2002 | Kwan ............... H04L 29/12066 707/999.01 |
| 7,143,052 B2 | 11/2006 | Lasalle et al. |
| 7,188,138 B1 | 3/2007 | Schneider |
| 7,218,722 B1 | 5/2007 | Turner et al. |
| 7,366,780 B2 | 4/2008 | Keller et al. |
| 7,392,324 B2 | 6/2008 | Cardone et al. |
| 7,463,648 B1 | 12/2008 | Eppstein et al. |
| 7,548,945 B2 | 6/2009 | Asnis |
| 7,680,876 B1 | 3/2010 | Cioli et al. |

(Continued)

*Primary Examiner* — Frantz B Jean
(74) *Attorney, Agent, or Firm* — Crawford Maunu PLLC

(57) ABSTRACT

In some particular embodiments, DNS servers are operated to maintain consistency of DNS records between the multiple master servers in response to certain types of communication situations. Each master DNS server monitors network connectivity by periodically testing or checking network connections of the master server (e.g., to another server). In one such exemplary context and particular embodiment, a first DNS master server operates by maintaining consistency of DNS records with at least one other DNS server. In this manner DNS records are updated using communications over a network and between the servers. Network isolation is detected and, after other related steps, restoration of connections to the at least one second DNS server is detected, and then queued DNS update requests are sent to the second DNS server. This approach is used to establish consistency of the DNS records between the DNS servers.

20 Claims, 5 Drawing Sheets

(56) References Cited

U.S. PATENT DOCUMENTS

| | | | |
|---|---|---|---|
| 7,984,163 B2 | 7/2011 | Almog | |
| 8,005,986 B2 | 8/2011 | Cardone et al. | |
| 8,072,967 B2 | 12/2011 | Rosenberg | |
| 8,116,207 B2 | 2/2012 | Schekochikhin et al. | |
| 8,194,640 B2 | 6/2012 | Ramachandran et al. | |
| 8,199,746 B2 | 6/2012 | Rosenberg et al. | |
| 8,204,047 B2 | 6/2012 | Rosenberg et al. | |
| 8,223,755 B2 | 7/2012 | Jennings et al. | |
| 8,228,903 B2 | 7/2012 | Rosenberg et al. | |
| 8,228,904 B2 | 7/2012 | Rosenberg et al. | |
| 8,274,968 B2 | 9/2012 | Rosenberg et al. | |
| 8,305,933 B2 | 11/2012 | Aboughanaima et al. | |
| 8,571,011 B2 | 10/2013 | Alt et al. | |
| 8,675,642 B2 | 3/2014 | Rosenberg et al. | |
| 8,681,995 B2 | 3/2014 | Seshadri et al. | |
| 8,761,040 B2 | 6/2014 | Jackson et al. | |
| 10,135,882 B1 | 11/2018 | Salour | |
| 2003/0039241 A1* | 2/2003 | Park | H04M 7/0075 370/352 |
| 2005/0111440 A1* | 5/2005 | Artru | G06F 21/10 370/352 |
| 2007/0041393 A1* | 2/2007 | Westhead | H04L 29/12066 370/428 |
| 2007/0091879 A1 | 4/2007 | Croak et al. | |
| 2007/0121603 A1 | 5/2007 | Clark et al. | |
| 2008/0098084 A1* | 4/2008 | Volz | H04L 29/12066 709/217 |
| 2008/0140847 A1 | 6/2008 | Almog | |
| 2008/0162637 A1 | 7/2008 | Adamczyk et al. | |
| 2010/0002686 A1* | 1/2010 | Rosenberg | H04M 7/0057 370/352 |
| 2010/0002687 A1 | 1/2010 | Rosenberg et al. | |
| 2010/0046507 A1 | 2/2010 | Rosenberg et al. | |
| 2010/0080376 A1 | 4/2010 | Hartley et al. | |
| 2010/0082828 A1 | 4/2010 | Jennings et al. | |
| 2011/0271005 A1 | 11/2011 | Bharrat et al. | |
| 2012/0117621 A1 | 5/2012 | Kondamuru et al. | |
| 2012/0155646 A1 | 6/2012 | Seshadri et al. | |
| 2012/0243530 A1 | 9/2012 | Rosenberg et al. | |

* cited by examiner

MULTIPLE-MASTER DNS SYSTEM

OVERVIEW

The demands on servers to provide adequate services to client devices are continuing to increase. In addition to ever increasing processing and bandwidth requirements, the number and variety of the services is also increasing. To meet these and other demands, it can be desirable to have a system that implements a number of servers that may be dynamically assigned to provide services based on user demand. These servers can be virtually identical to one another and operate in a parallel manner.

Generally, some type of mechanism is employed to assign different ones of the servers to provide services for each client connection. For example, a front-end controller can be placed in front of the servers to distribute and forward connections/services between the servers. Thus, incoming requests/connections are first received by the front-end controller. The device then distributes the workload between the servers. This arrangement works well for applications, such as a web-page server, in which successive requests by a client can be serviced by any one of the available servers. However, some online services require that successive client requests be processed by the same server. For such online services, use of a front-end controller to assign connections to different servers would require the front-end controller to maintain a mapping of the connections and servers. Maintenance of such a mapping table can create a bottleneck that frustrates linear scalability.

Another mechanism used to facilitate server assignment allows each client to select a desired server to provide the requested service. For this type of server assignment, a client retrieves a list of servers available, and then randomly selects one of the available servers from the list. This mechanism may be implemented and regulated using a Domain Name System (DNS) with multiple "A-records" and/or "service records" (SRV records, which allow for weights and priorities to be assigned to the servers). For instance, A-records contain the mapping between a domain name and an IP address. As it is possible to associate multiple IP addresses to one A-record, a service administrator can register a list of available servers in the A-record. The list of servers is provided to a client in response to a DNS query for a domain name of the service. The client then establishes a connection with a desired one of the available servers on the list. Further, this approach can be used to control load balancing between the servers by adjusting which servers are included in the list provided to the client.

DNS servers for a DNS zone are typically arranged into a hierarchy having a number of slave DNS servers, whose records are updated to match DNS records maintained by a master DNS server. Generally, a primary authoritative DNS name server in a DNS zone may accept changes to the DNS tables and respond to DNS resolution requests. Secondary authoritative DNS servers in the zone receive DNS updates from the master DNS server and do not accept changes to the DNS records. Since there is ordinarily only one primary authoritative DNS server per DNS zone, if the primary server goes down, updates to a DNS record will not be reflected in the records provided by secondary authoritative DNS servers serviced by the primary server. This can be problematic for protocols that require consistency between DNS servers.

SUMMARY

One or more embodiments are directed toward DNS control of network traffic that addresses challenges including those discussed above, and that are applicable to a variety of cellular applications, devices, systems and methods. These and other aspects of the present disclosure are exemplified in a number of implementations and applications, some of which are shown in the figures and characterized in the claims section that follows. One or more embodiments provide a system for maintaining DNS records using multiple master DNS servers.

In one embodiment, a method of operating a domain name system (DNS) is provided for use with a Voice-over-Internet Protocol (VoIP) call routing system. In particular, for use with a VoIP routing system having a domain name system (DNS) that includes at least two DNS servers in a multi-master configuration and provides dynamic DNS call routing information for setup of a VoIP call. DNS data records are updated between a first master DNS server and a second master DNS server. However, a master DNS server may become isolated from the other master DNS servers due to temporary loss of network connections. The first master DNS server monitors network connections from the first master DNS server to a wide area network. In response to detecting isolation, the first master DNS server operates in an isolation mode. The isolation mode defines rules for provision and/or updating DNS records for a plurality of DNS zones when in isolation that aids to maintain a consistent set of DNS records across the DNS system. While in the isolation mode, the first master DNS server monitors network connectivity of itself to the wide area network. The first master DNS server exits the isolation mode in response to detecting network connectivity of itself to the wide area network. In response to exiting the isolation mode, and according to the rules for the plurality of DNS zones, the first master DNS server updates DNS data records at the first master DNS server and for a first set of DNS zones using data from a second master DNS server of the DNS servers.

In another embodiment, a DNS system is provided. The system includes a plurality of slave DNS servers and a plurality of master DNS servers. The master and slave DNS servers are configured to operate in a multi-master arrangement. Each master DNS server is configured and arranged to operate in a normal mode and an isolation mode. While operating in a normal mode of operation, the master DNS server is configured to update DNS data records between the master DNS server and other ones of the plurality of master DNS servers and monitor network connections for network isolation of the master DNS server relative to a wide area network. The master DNS server is configured to enter the isolation mode in response to detecting network isolation of the master DNS server. While in the isolation mode of operation, the master DNS server is configured to monitor the network connection of the master DNS server relative to the wide area network. In response to detecting network connectivity of the master DNS server relative to the wide area network, the master DNS server is configured to update DNS records according to an isolation rule set, which indicates how DNS records are to be updated for different DNS zones, and exit the isolation mode of operation.

In yet another embodiment, a system for routing VoIP connections is provided. The system includes a plurality of VoIP processing servers and a DNS system configured to assign client connections to selected ones of the plurality of VoIP servers, the DNS system includes a plurality of slave DNS servers that are configured and arranged with a plurality of master DNS servers to operate in a multi-master arrangement. Each master DNS server is configured to operate in normal and isolation modes similar to those described above. While operating in a normal mode of operation, the master DNS server is configured to update DNS data records between the master DNS server and other ones of the plurality of master DNS servers and monitor network connections for network isolation of the master DNS server relative to a wide area network. The master DNS server is configured to enter the isolation mode in response to detecting network isolation of the master DNS server. While in the isolation mode of operation the master DNS server is configured to monitor the network connection of the master DNS server relative to the wide area network. In response to detecting network connectivity of the master DNS server relative to the wide area network, the master DNS server is configured to update DNS records according to an isolation rule set, indicating how DNS records are to be updated for different DNS zones, and exit the isolation mode of operation.

The above summary is not intended to describe each illustrated embodiment or every implementation of the present disclosure.

BRIEF DESCRIPTION OF THE DRAWINGS

The disclosure may be more completely understood in consideration of the following detailed description of various embodiments of the disclosure in connection with the accompanying drawings, in which.

Figure 1:
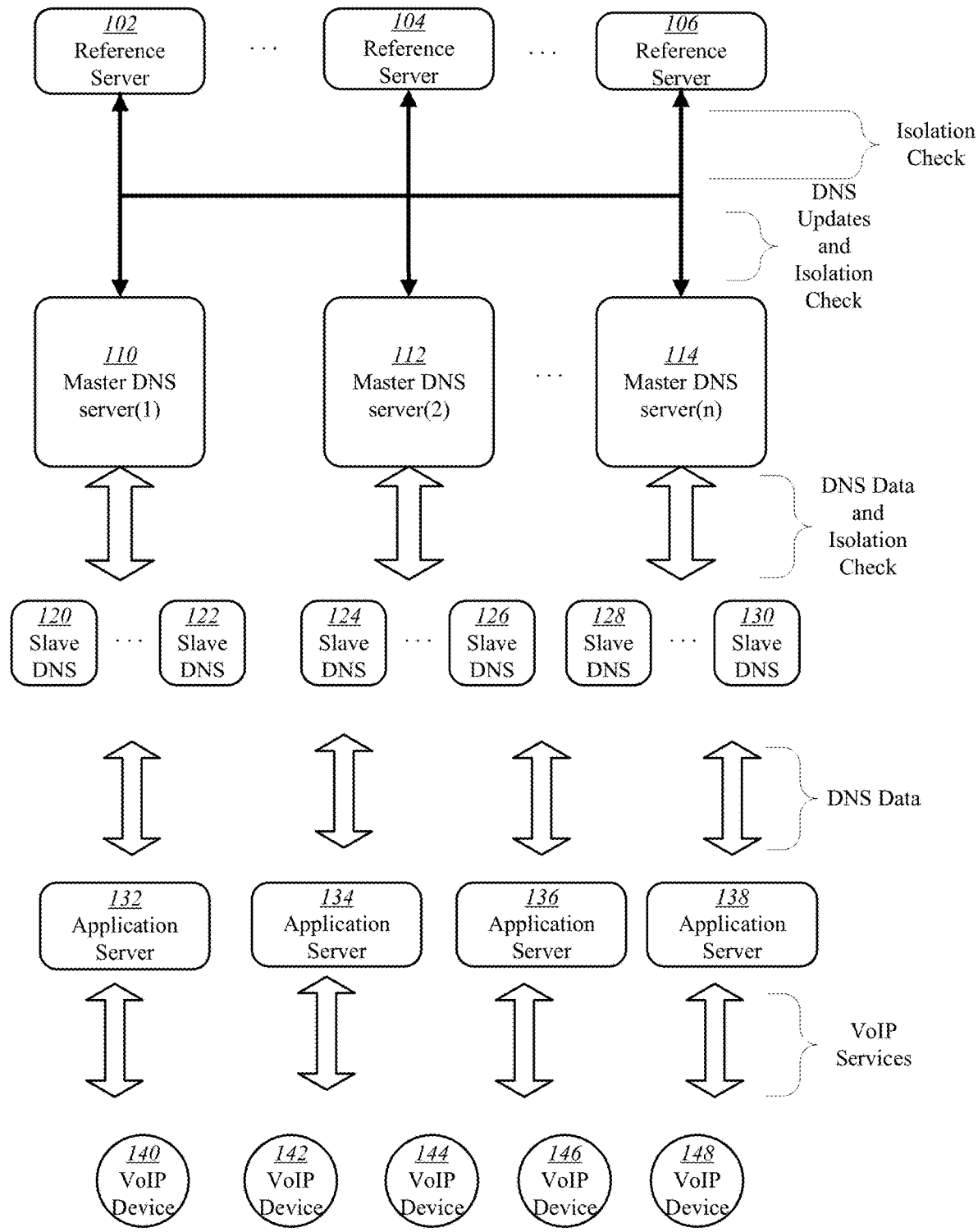
FIG. 1 shows a multi-master DNS system consistent with one or more embodiments.

While the embodiments are amenable to various modifications and alternative forms, specifics thereof have been shown by way of example in the drawings and will be described in detail. It should be understood, however, that the intention is not to limit the embodiments to the particular examples described herein. On the contrary, the intention is to cover all modifications, equivalents, and alternatives falling within the spirit and scope of the invention.

DETAILED DESCRIPTION

Aspects of the present disclosure are believed to be applicable to a variety of different types of devices, systems and arrangements involving domain name resolution provided by DNS servers. While the present disclosure is not necessarily limited to such applications, various aspects may be appreciated through a discussion of various examples in this context. Some DNS systems implement redundancy by including multiple master DNS servers, which periodically communicate with each other to synchronize their databases (e.g., using multi-master replication). However, a master DNS server may become isolated from the other master servers due to temporary loss of network connections. In such a scenario, DNS records of the isolated server may become inconsistent with that of the other master DNS servers.

One or more embodiments provide a system and method for DNS that is resistant to losses of network connections. In some particular embodiments, DNS servers are operated to maintain consistency of DNS records between the multiple master DNS servers in response to connection failure. Each master DNS server monitors network connectivity by periodically testing network connections of the master DNS server (e.g., to other servers, including other master DNS servers) to determine whether the master DNS is isolated in a manner that may inhibit updates from being distributed between the master DNS servers. As explained in more detail below, such isolation can cause DNS records of different DNS servers to become inconsistent, which may affect operation of online services. In response to detecting failure of a network connection, a master DNS server that becomes isolated is configured to enter an isolation mode in which the master DNS monitors the status of connections and takes appropriate actions to update and/or recover DNS data when connections are restored.

For ease of reference, a master DNS server may be referred to as a master server and a slave DNS server may be referred to as a slave server. More particularly, a master server that becomes isolated due to loss of network connections may be referred to as an isolated master server herein. Also, a master server that remains connected to other master servers may be referred to as a connected master server herein.

In some embodiments, an isolated master server is configured to take different actions depending on which connection's failure caused the isolation. For instance, a master server may have several network connections including, e.g., a connection to other master servers, a connection to slave servers, and/or a connection to a reference server used to store a distributed copy of the DNS records. In one implementation, an isolated master server may be configured to perform a first set of actions in response to recovery from failure of a first combination of the connections, and perform a second set of actions in response to recovery from failure of a second combination of the connections. In some implementations, the isolated master server may be configured to enter different isolation modes in response to failure of different combinations of the connections. Each of the different isolation modes is configured to perform appropriate actions in response to recovery of the corresponding connections.

In one or more embodiments, an isolated master server may be configured to exchange DNS records with connected master servers, in response to recovery of network connections, to achieve a uniform set of DNS records across the multiple master DNS servers. Isolation of a master server may cause DNS records of the isolated master server to become inconsistent with that of the other master servers, which may adversely affect operations in various application settings. For example, if a master server becomes isolated from other ones of the master servers (connected master servers), updates received by the isolated master server may not be communicated to the connected master servers and vice-versa. For instance, in one scenario, an isolated master server may remain connected to slave servers and client applications located in a DNS zone of the isolated master and may continue to receive updates that cannot be communicated to the connected master servers until isolation is resolved.

In another scenario, the isolated master server may be isolated from slave servers and client applications in the DNS zone and thus unable to receive updates of DNS records for this zone. In such a scenario, client applications of the DNS zone may be able to submit updates to one of the connected master servers. Due to the isolation, the updates cannot be communicated to the isolated master server until connections are restored. In multi-master replication between master servers, the last of two conflicting updates should win. When isolation is resolved, updates to the DNS records should be exchanged in a manner that maintains the most recent update for each DNS record, regardless of whether the isolated or connected master server is updated. If updates are propagated from master servers down to slave servers and/or client applications before inconsistencies between DNS records are resolved, inconsistent DNS results may be provided to client applications.

In some embodiments, a master server is prevented from updating DNS records or providing updates to slave servers while operating in an isolation mode. In response to the connections of an isolated master server being restored, the server is configured to exchange DNS records with connected master servers to reestablish a uniform set of DNS records in between the master servers. After DNS records of the previously isolated master server are updated, the previously isolated master server is configured to update slave servers.

In some embodiments, an isolated master server is configured to update DNS records differently for different DNS zones once isolation is resolved. At a first master server, network connections are monitored to detect network isolation of the first server relative to a wide area network (e.g., the internet). The first master server enters an isolation mode in response to detecting network isolation of the first master server relative to the wide area network. The isolation mode defines rules for updating different DNS zones. While in the isolation mode, the first master server monitors network connections of itself relative to the wide area network. The first master server exits the isolation mode in response to detecting that network connectivity between the first master server and the wide area network has been restored. In response to exiting the isolation mode and to the rules for the plurality of DNS zones, DNS data records at the first master server are updated for a first set of DNS zones using data from the connected master servers.

In some embodiments, the isolation mode defines a set of isolation rules for updating different DNS zones. For instance, for a first isolation mode, in which a master server is isolated from the local area network, DNS data records are updated at the isolated master server for a second set of DNS zones using data from the connected master servers when connections are restored. In another isolation mode, in which the first master server remains connected to the local area network while operating in the isolation mode, DNS data records at the second master DNS server are updated for the second set of DNS zones using data from the first master DNS server when connections are restored.

FIG. 1 illustrates an example multi-master DNS hierarchy, consistent with one or more embodiments. The hierarchy includes a plurality of master DNS servers (e.g., 110, 112, and 114) connected in a multiple master arrangement in which each master DNS server maintains a redundant copy of the DNS records. The master DNS servers each write DNS updates to a reference server (e.g., 102, 104, and 106) that is used to maintain a shared redundant copy of the DNS records. The reference server allows the master servers to periodically communicate with each other to synchronize their DNS records using multi-master replication. Each of the master servers is connected to service slave servers (e.g., 120, 122, 124, 126, 128, and 130) in a respective DNS zone(s). For example, master server 110 provides DNS updates for slave servers 120 and 122 in a first DNS zone and master server 112 provides DNS updates for slave servers 124 and 126 in a second DNS zone.

As indicated above, a master server may become isolated from the other master servers due to temporary loss of network connections. In such a scenario, DNS records of the isolated server may become inconsistent with that of the other master servers. As a result, DNS records provided to slave servers may be different in the first and second DNS zones. As described in more detail below, each master DNS server monitors network connectivity of the master server (e.g., to other master servers) to determine whether the master DNS is isolated in a manner that prevents updates from being distributed between the master DNS servers and controls distribution and updates of DNS records to maintain consistency of DNS records in the DNS system.

In one or more embodiments, DNS may be used to facilitate assignment of different ones of the servers to provide services for incoming client/user connections. For instance, a DNS record for a domain name may be configured to list one or more servers available to provide the requested service to a client/user. In this example, the DNS servers may be configured to assign application servers (e.g., 132, 134, 136, and 138) to provide VoIP services for VoIP devices (e.g., 140, 142, 144, 146, and 148). Use of DNS to facilitate assignment of VoIP services to VoIP devices is discussed in more detail below with reference to FIGS. 4 and 5.

Figure 2:
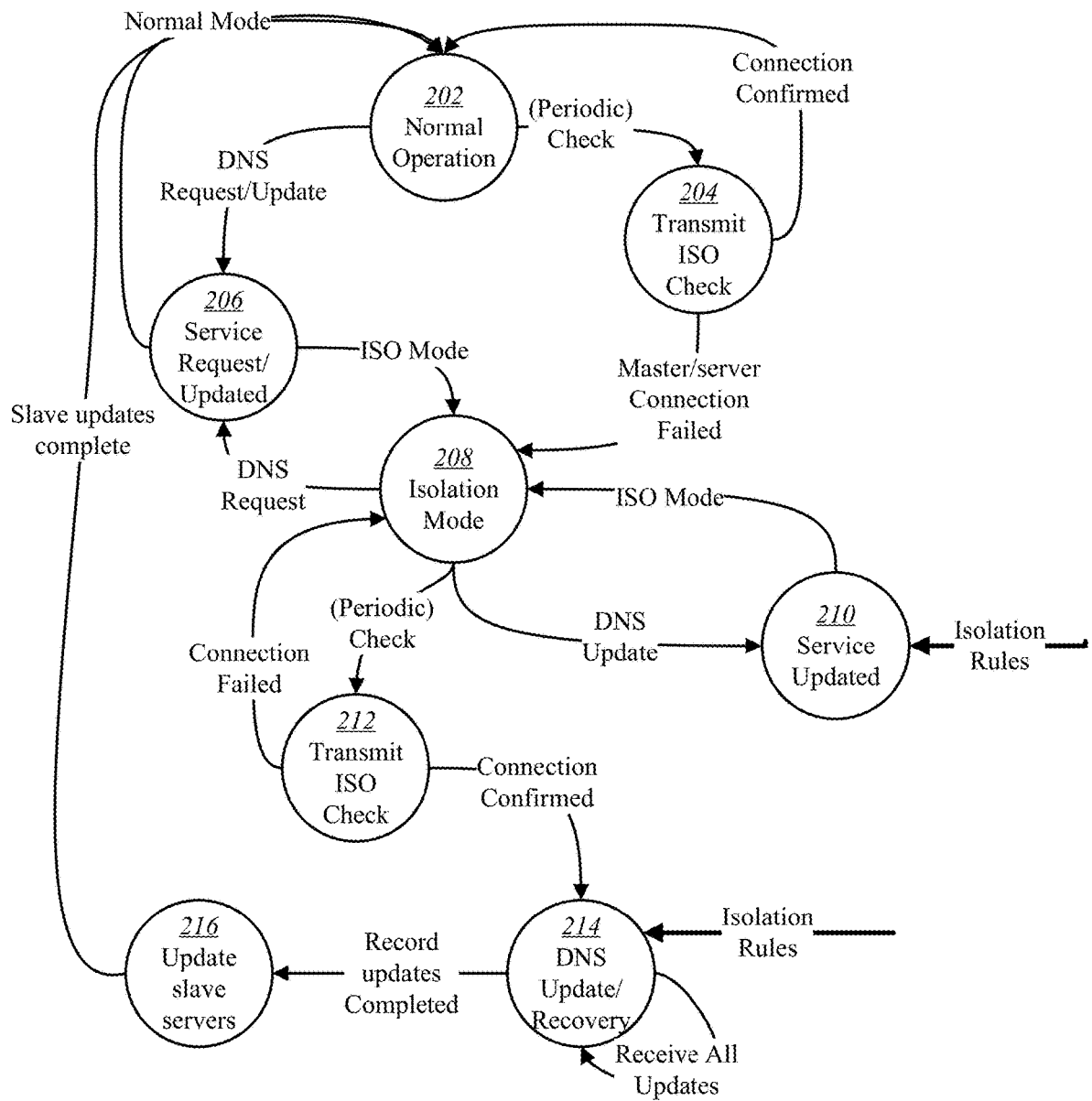
FIG. 2 shows a flowchart of a process for operating a master DNS server of a multi-master system, consistent with one or more embodiments.

FIG. 2 shows a flowchart of a process for operating a master DNS server of a multi-master system, consistent with one or more embodiments. In a normal mode of operation at stage 202, the master server is connected to a reference server used by the master servers to store a shared copy of DNS records. The master server is also connected to other master servers, and can receive/coordinate updates with the other master servers. The master server is also connected to a number of slave servers whose DNS records are updated by the master server.

If connection to either the reference server or the other master servers is interrupted, the master server becomes isolated. If the master server becomes isolated, DNS records of the server can become inconsistent with other master servers in the system. To prevent such inconsistencies from effecting DNS operations, an isolated master server is prevented from updating DNS records or providing updates to slave servers. If slave servers were updated by the isolated master server, the DNS records may be inconsistent with records provided by DNS servers that are configured as slaves to other master servers.

While operating in the normal mode at stage 202, the master server tests connections to the reference server (server connection) and connection to other master servers (master connection) at stage 204. The testing of connections may be performed at different times in different implementations. For instance, the testing may be performed periodically at regular intervals, triggered by an event, performed at random times, etc. If either of the master or server connections is down, the master DNS server transitions into an isolation mode of operation at stage 208, in which the master DNS server does not provide DNS records to the slave DNS servers.

It is recognized that a connection may be lost between the isolation tests performed at stage 204. In some implementations, to ensure that updates and service requests are not processed by an isolated master DNS server, each master DNS server is configured to test for isolation before processing a received update or service request at stage 206. If isolation is detected at stage 206, the master DNS server transitions into an isolation mode at stage 208. Otherwise, the update or service request is processed at stage 206 and the master DNS server continues to operate in the normal mode at stage 202.

The connection to the reference servers can be tested, for example, by transmitting ISO-test packets to one or more other external servers at stage 204. For instance, in one embodiment, connection to the reference servers can be tested, for example, by transmitting ISO-test packets (e.g. ping) to external web servers (U.S. Naval Observatory Network Time Protocol (NTP) servers, www.google.com, www.uspto.gov, etc). If a response is received from any of the external web servers, the reference server connection is determined to be operational. Otherwise, the connection to the reference server is determined to be unavailable. The connection with other master servers may be tested in a similar manner. It is recognized that various implementations may utilize any number of other methods for testing of network connections that are known in the art. The different methods of testing network connections may be used alone or in combination. If the server connection and master connection are both determined to be available, the master server continues to operate in the normal mode at stage 202. Otherwise, if either the server connection or the master connection is determined to be unavailable, the master server enters the isolation mode at stage 208.

While operating in the isolation mode, the master server does not provide or update DNS records unless sufficient connections are available to coordinate with other master servers to ensure that DNS records do not become inconsistent. Provision and updating of DNS records in the isolation mode are discussed in more detail below with reference to TABLE 1.

The master server performs isolation tests at stage 212 to detect when master and server connections have been restored. As discussed with reference to testing stage 204, isolation tests in stage 212 may be performed at regular intervals, triggered by an event, performed at random times, etc. Once master and server connections have been restored, any queued updates can then processed by the master server at stage 214 according to the isolation rules. Updates that have been performed by other master servers are also retrieved at stage 214. Once record updates have been completed, slave DNS servers of the master DNS server are updated at stage 216.

As indicated above, in some embodiments, the update and recovery process may be different depending on the connections of the isolated master DNS server. TABLE 1 shows some different connection scenarios that may be encountered in one or more implementations. For ease of reference, the respective update and recovery process for each different combination of network connections of the master server are described as a different isolation mode. Various embodiments of the present disclosure are directed toward the use of different rules based upon the particular isolation mode. These rules can define how the master DNS server operates while in isolation mode as well as how the master DNS server recovers once the isolation mode is exited. Moreover, the rules can define how the master server handles transitions between the different isolation modes. It is understood that various embodiments may be implemented to operate using any number of isolation modes. For ease of explanation, embodiments and examples are primarily described with reference to a master server is configured to operate in three different isolation modes shown in TABLE 1.

For instance, the master server may operate in isolation mode 1 in response to any number of different potential problems with the connection to the reference server. For instance, it may be that one or more of the reference servers has a local problem (e.g., is subject to a denial-of-service (DOS) attack or is down for maintenance). In other instances, there may be a wider problem with Internet connectivity. This could also signify that the local Internet connection is unreliable. Thus, it may be that the master DNS server is currently subject to a DOS attack or has another issue associated with Internet connectivity. This can result in intermittent failures and successes for connection tests for both reference servers and other master DNS servers. The master server may transition from isolation mode 1 to isolation mode 2 in response to encountering similar problems with the connections to other master servers. The master server may transition from isolation mode 2 to isolation mode 3 in response to encountering similar problems with the connections to the slave servers.

Isolation rules associated with each isolation mode may direct how the master server operates in each of the different isolation modes. For instance, in some embodiments, the rules may specify that a master server operating in any of isolation mode 1, 2, and 3 will not update DNS records until and unless a successful connection has been established with the other master servers as well as the reference server. Alternatively or in addition, the rules may specify that a master server operating in isolation mode 1 will communicate to slave servers that a DNS record is invalid if another master server indicates that the record has been updated in the reference library. In such embodiments, the master server operating in modes 2 or 3, in which the master server is isolated from other master servers, will not provide DNS records to slave servers because it cannot be determined whether the records have been updated by another master server.

The update and recover rules can also differ depending on whether the connection to slave DNS servers or local applications was lost. For instance, if an isolated master DNS server has a connection to slave DNS servers and local applications, the master DNS server can receive and queue the requests for later updating. However, if local applications are unable to establish a connection with the isolated master DNS server, update requests may be sent to another master DNS server. In the former scenario, the update and recovery process should update DNS records for the local zone using the queued records from the previously isolated master DNS server. In the later scenario, the update and recovery process should update DNS records for the local zone using records from the other master DNS servers.

TABLE 1

| Connection Scenario | Connection to Reference Server (server connection) | Connection to Other Master DNS Servers (master connection) | Connection to Local Slave DNS Servers |
|---|---|---|---|
| Normal Mode | Connected | Connected | Connected |
| Isolation 1 | No connection | Connected | Connected |
| Isolation 2 | Noconnection | No connection | Connected |
| Isolation 3 | No connection | No connection | No connection |

Figure 3:
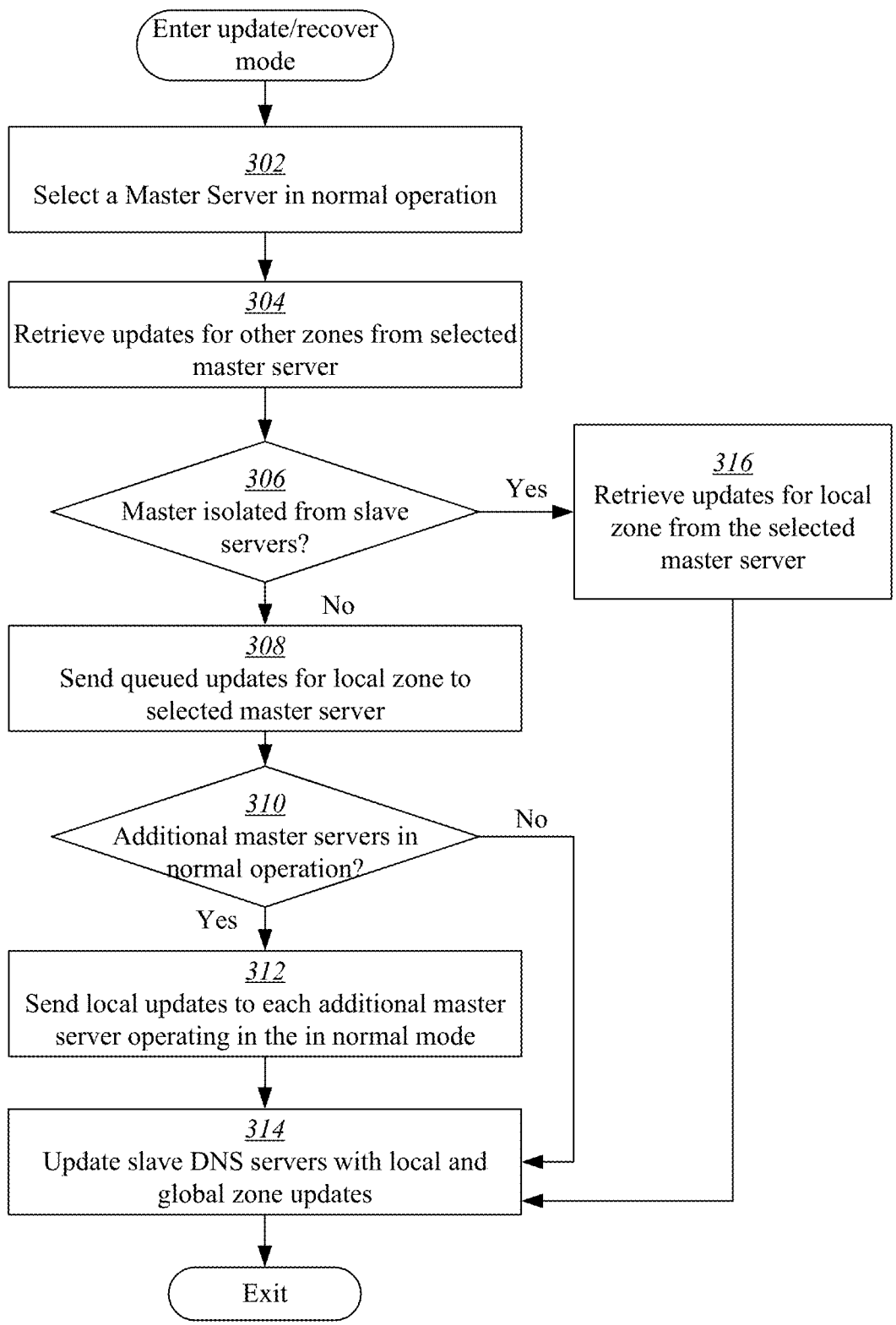
FIG. 3 shows a flowchart of a method for performing DNS updates and recovery after restoring master and server connections in the isolation mode, consistent with one or more embodiments.

FIG. 3 shows a flowchart of a method for performing DNS updates and recovery after restoring master and server connections in the isolation mode. DNS record updates for non-local zones are retrieved from other master DNS servers at blocks 302 and 304. One of the other master DNS servers is selected at block 302. Updates from the selected DNS server are retrieved at block 304. If the isolated server was isolated from slave servers at decision block 306, updates for local DNS zones are retrieved from the selected master server at block 316. Otherwise, local DNS zone records are updated using data of the isolated master DNS server at blocks 308-312. Update requests queued at the isolated master DNS server are sent to the selected master at block 308. Local update requests are sent to each additional master DNS server at blocks 310 and 312. After DNS records of the master DNS servers have been updated, records of slave DNS servers are updated at block 314.

For some online services, it may be desirable to dynamically adjust which servers are assigned to service a particular client connection. For instance, in voice-over-IP (VoIP) applications, server selection is based on the current availability of servers and latency of connections among the available servers. Depending on network conditions, geographic location of clients and servers, and server load, a list of servers provided to clients by DNS may need to be frequently updated to reflect the changes in server load and connection latency. However, unlike many online services such as web-servers, VoIP services need to be synchronized between multiple clients who are located in separate geographic locations. Due to such geographic separation, different clients may retrieve DNS queries from different DNS servers. Inconsistencies between these different DNS servers can inhibit the ability to provide effective VoIP services to users.

Figure 4:
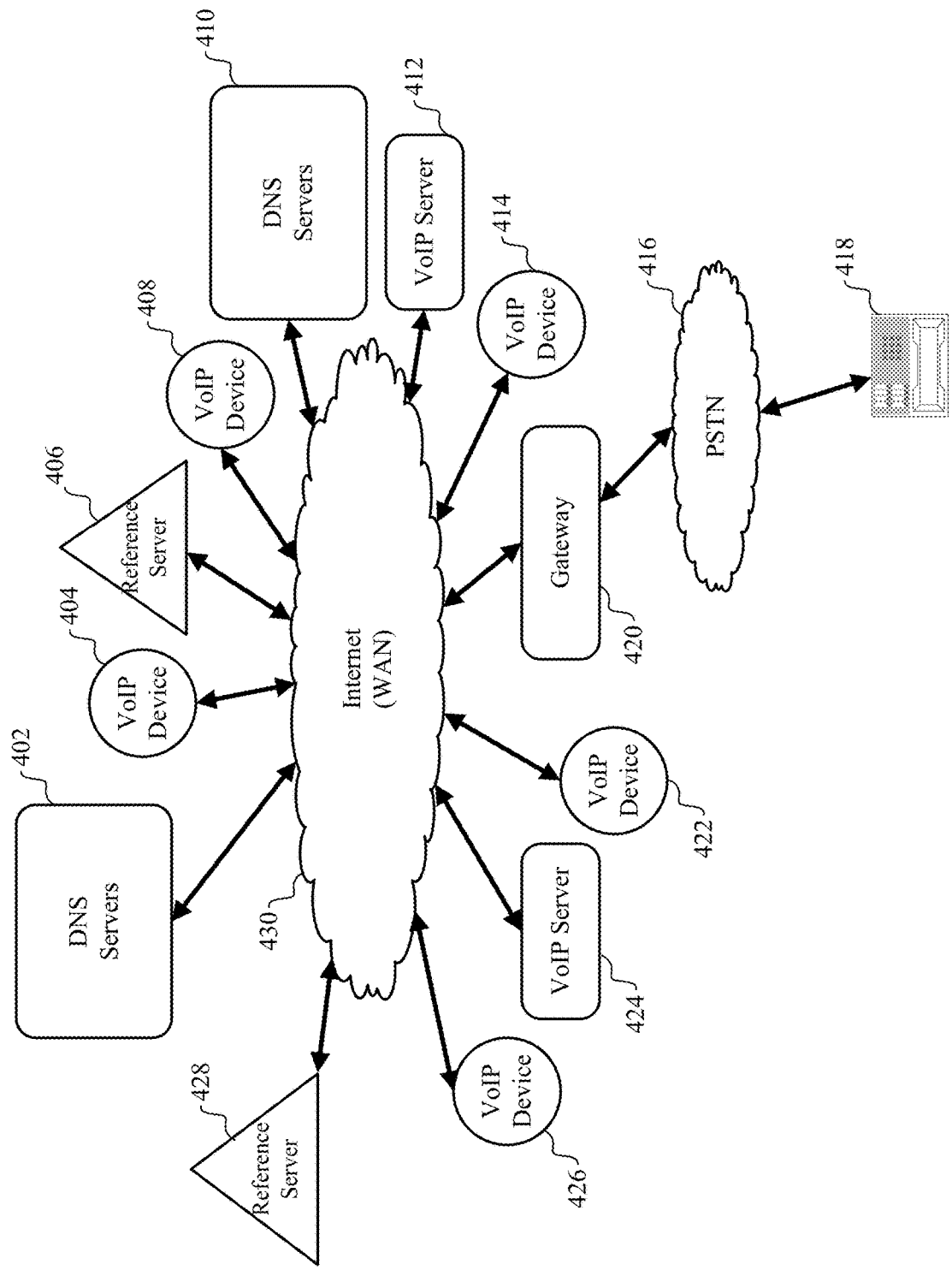
FIG. 4 shows a VoIP network system, consistent with one or more embodiments.

The multi-master DNS system is believed to be applicable to a number of different applications that require consistency of records in the DNS system. However, for ease of explanation, the embodiments and examples are primarily described with reference to VoIP applications herein. FIG. 4 shows a VoIP network configured in accordance with one or more embodiments. The VoIP network includes a number of VoIP client/user devices (404, 408, 414, 422, and 426) and a number of VoIP servers (e.g., 412 and 424). In response to a VoIP device request, the VoIP servers are configured to facilitate creation of a VoIP connection between two of the VoIP devices. In some embodiments, a VoIP server may also be configured to facilitate VoIP communication between a VoIP device and a plain old telephone system (POTS) 418 of a PSTN network 416 that is connected to the internet 430 via a gateway 420. As indicated above, and explained in more detail with reference to FIG. 5, VoIP connections may be assigned to VoIP servers using a DNS system. As discussed with reference to FIGS. 2 and 3, the DNS system includes DNS servers (e.g., 402 and 410) connected in a multi-master configuration. As discussed above, the DNS servers are configured to store updated DNS records in a distributed reference server (e.g., 406 and 428) that is shared by the master DNS servers of the DNS system.

As indicated above, DNS may be used to assign different ones of the servers to provide services for incoming client connections. A list of available servers can be provided to clients using DNS A-records or SRV records. A-records contain the mapping between a domain name and an IP address. As it is possible to associate multiple IP addresses to one A-record, a service administrator can register a list of available servers in the A-record. The list of servers is provided to a client, in response to a DNS query for a domain name of the service. The client then establishes a connection with a desired one of the available servers on the list. By adjusting which servers are included in the list provided to the client, server assignment can be adjusted for load-balancing and latency adjustment.

Figure 5:
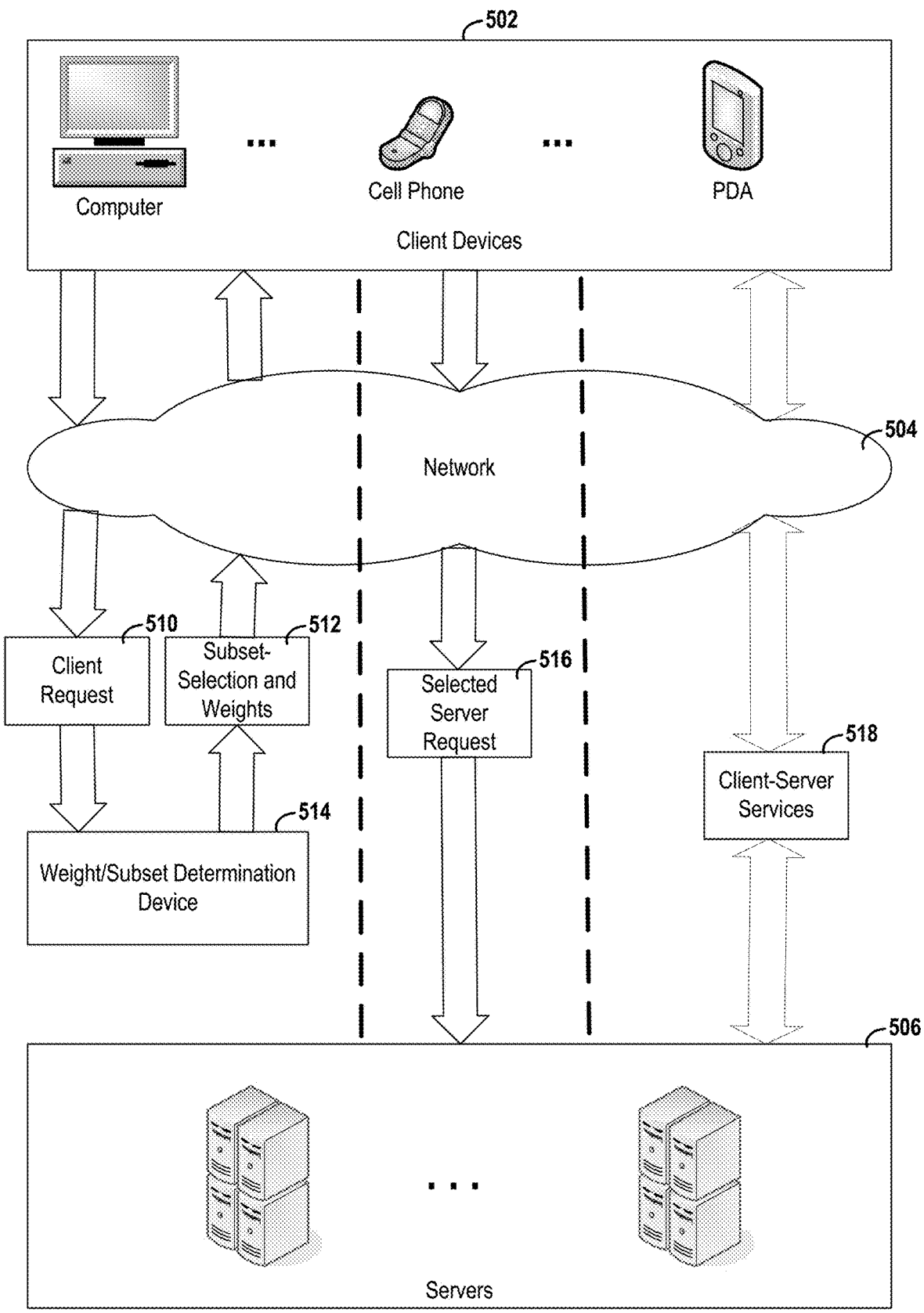
FIG. 5 shows a system for server assignment and load balancing using DNS, consistent with one or more embodiments.

FIG. 5 shows a system for server assignment and load balancing using DNS, consistent with one or more embodiments. Client devices 502 represent a number of different communication devices that connect to network 504. Non-limiting examples include home computers, cell phones, personal digital assistants (PDAs), television receivers, laptops, and Voice over Internet Protocol (VoIP) devices. FIG. 5 shows communication flow between the client devices 502, the servers 506, and a weight/subset determination device 514. The vertical arrows represent communications between devices. These arrows are arranged to show an example sequence of communication events between devices with the first communications occurring on the left and the last communications occurring on the right. The communication events to the left of the first dotted line represent an initial connection client request and DNS server response. The response may, for instance, indicate a list of servers available to provide the requested service.

The center communication event, located between the dotted lines, represents a client request for a specific server. The bi-directional communication event, located on the right, represents the fulfillment of the client requested service/connection. The first communication shown is a client request 510 for services from (and/or connections to) the servers 506. In response to this request, the weight/subset determination device 514 determines and provides connection information to the requesting client device. This connection information can include weight values 512 for the servers that may be used to influence client selection of particular servers. By adjusting the servers included in the list and/or adjusting the weight values assigned to each server in the list, assignment of connections to the servers can be adjusted. Alternatively or in addition, the list may include other data for each server such as available processing resources, current processing load, latency, etc.

Once the client has selected a server, the client sends a connection request 516 that specifies the selected server. The selected server responds to the client request and a connection is then established between the selected server and the requesting client device. This connection can be used to provide a variety of desired client-server services 518.

According to one embodiment, weight/subset determination device 514 is implemented using a dedicated processor, server, circuit, or device. Such a device can be assigned to handle all incoming requests from clients 502. In this manner, the servers 506 are free from handling this portion of the process. This allows for the device 514 to be located in physically different locations from one or more of the servers 506. In certain embodiments, device 514 can be implemented using a plurality of separate servers, processors, circuits, or devices. In this manner, the client requests can be distributed so as not to have single point of failure or a bottleneck. Various other configurations of devices are possible, such as a device that also serves as a gateway or router for one or more of the servers 506.

These and other aspects can be implemented in a number of different manners including, but not limited to, stored executable data, computer processors, programmable logic, hardware circuit logic and combinations thereof. The various embodiments described above are provided by way of illustration only and should not be construed to be limiting. Based upon the above discussion and illustrations, those skilled in the art will readily recognize that various modifications and changes may be made without strictly following the exemplary embodiments and applications illustrated and described herein. For example, the methods, devices, and systems discussed herein may be implemented in connection with voice-over Internet services, streaming media and call processing. Some various embodiments may also be implemented using a variety of approaches such as those involving a number of different operating systems and software programs/packages. Such modifications and changes do not depart from the true spirit and scope of the envisioned embodiments, including that set forth in the following claims.

What is claimed is:

1. An apparatus comprising:
a plurality of domain name system (DNS) slave servers configured and arranged for use in a data communications routing system;
at least two DNS master servers in a multi-master configuration that provides dynamic information routing in the data communications routing system, wherein a first master DNS server of the at least two DNS master servers is configured and arranged to establish consistency of DNS records between the first and the second DNS master servers by:
detecting network isolation of the first DNS master server by monitoring connections to the network;
preventing, in response to the network isolation, updates to the DNS records according to a set of isolation rules which indicate how DNS records are to be updated for different DNS zones; and
updating, according to the set of isolation rules and in response to restoration of connections to the first DNS master server, the DNS records to establish consistency of the DNS records between the first and second DNS master servers.

2. The apparatus of claim 1, wherein the first DNS master server is further configured to establish consistency of the DNS records between the first and second DNS master servers by entering different isolation modes in response to detecting different combinations of isolation relative to the DNS slave servers and the first DNS master server.

3. The apparatus of claim 1, wherein the first DNS master server is further configured to establish consistency of the DNS records between the first and second DNS master servers by maintaining consistency of the DNS records with at least one of the plurality of DNS slave servers.

4. The apparatus of claim 1, wherein the first DNS master server is further configured to establish consistency of the DNS records between the first and second DNS master servers by:
detecting network isolation from at least one of the DNS slave servers; and
entering an isolation mode in response to detecting the network isolation from the at least one DNS slave server.

5. The apparatus of claim 1, wherein the first DNS master server is further configured to establish consistency of the DNS records between the first and second DNS master servers by:
receiving and queuing, DNS update requests received from DNS slave servers for the first DNS master server in response to detection that the first DNS master server is in isolation mode; and
processing the queued DNS update requests according to the set of isolation rules and in response to the first DNS master server leaving isolation mode.

6. The apparatus of claim 1, wherein the first DNS master server is further configured to establish consistency of the DNS records between the first and second DNS master servers by: sending the updated DNS data records to the second DNS master server responsive to a request from the second DNS master server.

7. The apparatus of claim 1, wherein the first DNS master server is further configured to establish consistency of the DNS records between the first and second DNS master servers by:
receiving and processing, in response to the restoration of connections, DNS updates queued by the second DNS master server during the network isolation.

8. A method for providing dynamic DNS information routing for use in a data communications routing system, the method comprising:
operating at least one processor circuit as a first DNS master server by:
maintaining consistency of DNS records with at least one second DNS master server by updating DNS data records using communications over a network and between the first and second DNS master servers;
detecting network isolation of the first DNS master server by monitoring connections to the network;
preventing, in response to the network isolation, updates to the DNS data records according to a set of isolation rules which indicate how DNS records are to be updated for different DNS zones;
detecting restoration of connections to the first DNS master server; and
updating, according to the set of isolation rules and in response to restoration of connections to the first DNS master server, the DNS data records to establish consistency of the DNS records between the first and second DNS master servers.

9. The method of claim 8, further comprising entering different isolation modes in response to detecting different combinations of isolation relative to DNS slave servers and the first DNS master server.

10. The method of claim 8, further comprising maintaining consistency of the DNS records with at least one DNS slave server.

11. The method of claim 10, further comprising:
detecting network isolation from the at least one DNS slave server; and
entering an isolation mode in response to detecting the network isolation from the at least one DNS slave server.

12. The method of claim 11, further comprising:
receiving and queuing, in response the isolation mode, DNS updates; and
processing, in response to leaving the isolation mode, the queued updates according to a set of isolation rules.

13. The method of claim 8, including sending the updated DNS data records to the second DNS master server responsive to a request from the second DNS master server.

14. The method of claim 8, further comprising receiving and processing, in response to the detecting restoration of connections, DNS updates queued by the first DNS master server during the network isolation.

15. A system for updating domain name system (DNS) connection information, comprising:
a plurality of data processing servers; and
a DNS system configured to assign client connections to selected ones of the plurality of data processing servers, the DNS system including a plurality of DNS slave servers configured and arranged with a plurality of DNS master servers to operate in a multi-master arrangement, each master DNS server being configured and arranged to:

monitor network connections of the master DNS server for network isolation of the master DNS server relative to at least one wide area network;

prevent, in response to the network isolation, updates to the DNS system according to a set of isolation rules which indicate how DNS records are to be updated for different DNS zones; and in response to detecting network connectivity of the master DNS server relative to the wide area network, update DNS records according to the isolation rules.

16. The system of claim 15, wherein the isolation rules cause the master DNS server to:

perform the updating of DNS records for a first set of DNS zones according to a first set of isolation rules; and perform the updating of DNS records for a second set of DNS zones according to a second set of isolation rules.

17. The system of claim 15, wherein:

a first set of isolation rules cause the DNS master server to update DNS records at the DNS master server for a first set of DNS zones using data from a different one of the plurality of DNS master servers; and a second set of DNS rules cause the DNS master server to:

in response to the DNS master server being isolated from DNS slave servers in a second set of DNS zones when entering an isolation mode, update DNS records at the DNS master server for the second set of DNS zones using data from the different one of the plurality of master servers; and in response to the DNS master server being connected to DNS slave servers in the second set of DNS zones when entering the isolation mode, update DNS records at the other ones of the plurality of DNS master servers for the second set of DNS zones using data from the different one of the plurality of master servers.

18. The system of claim 17, wherein ones of the plurality of DNS slave servers in the second set of DNS zones are configured and arranged to:

retrieve DNS updates with the DNS master server in response to the DNS master server being connected to the ones of the plurality of DNS slave servers; and retrieve DNS updates with a different one of the DNS master servers in response to the DNS master server being isolated from the ones of the plurality of DNS slave servers in the second set of DNS zones.

19. The system of claim 15, wherein each DNS master server is further configured and arranged to monitor network connections for network isolation of the DNS master server relative to a local area network that includes one or more DNS servers configured as slaves to the DNS master server, one or more DNS servers being in a first set of DNS zones, and wherein first and second rule sets for the DNS zones specify how DNS data records are updated based upon whether or not the local area network is isolated from the master DNS server.

20. The system of claim 17, wherein each DNS master server is further configured and arranged to, in response to exiting an isolation mode corresponding with the detected network isolation, update DNS data records at the DNS master server for a second set of DNS zones using data from another one of the DNS master servers.

* * * * *